United States Patent
Jaakkola et al.

(10) Patent No.: US 8,526,950 B2
(45) Date of Patent: Sep. 3, 2013

(54) DETERMINING HANDOVER BASED ON STATE OF MOBILE TERMINAL

(75) Inventors: Mikko Jaakkola, Lempäälä (FI); Jukka-Juhana Latva, Tampere (FI); Henry Haverinen, Tampere (FI)

(73) Assignee: Nokia Corporation, Espoo (FI)

( * ) Notice: Subject to any disclaimer, the term of this patent is extended or adjusted under 35 U.S.C. 154(b) by 389 days.

(21) Appl. No.: 10/748,088

(22) Filed: Dec. 30, 2003

(65) Prior Publication Data

US 2005/0143071 A1  Jun. 30, 2005

(51) Int. Cl.
*H04M 3/00* (2006.01)
*H04M 1/00* (2006.01)
*H04W 36/00* (2009.01)
*H04W 4/00* (2009.01)

(52) U.S. Cl.
USPC ........... 455/436; 455/418; 455/437; 455/566; 370/331

(58) Field of Classification Search
USPC ........... 455/435.1, 435.2, 436–444, 418–420, 455/434, 452.1–452.2, 509, 524–525, 550.1, 455/556.1–556.2, 557–558, 561, 566; 370/328–329, 331–332, 338, 341
See application file for complete search history.

(56) References Cited

U.S. PATENT DOCUMENTS

| | | | | |
|---|---|---|---|---|
| 5,991,287 A | * | 11/1999 | Diepstraten et al. | 370/338 |
| 6,122,519 A | * | 9/2000 | Tat | 455/450 |
| 6,178,388 B1 | * | 1/2001 | Claxton | 702/107 |
| 6,381,468 B1 | * | 4/2002 | Larsen et al. | 455/550.1 |
| 6,556,840 B2 | * | 4/2003 | Zicker et al. | 455/551 |
| 6,871,074 B2 | * | 3/2005 | Harris et al. | 455/452.1 |
| 7,159,194 B2 | * | 1/2007 | Wong et al. | 715/863 |
| 7,312,885 B2 | | 12/2007 | Matsumoto et al. | |
| 2002/0183062 A1 | * | 12/2002 | Kubosawa | 455/436 |
| 2003/0100308 A1 | | 5/2003 | Rusch | |
| 2003/0135624 A1 | * | 7/2003 | McKinnon et al. | 709/228 |
| 2003/0153312 A1 | * | 8/2003 | Lee et al. | 455/436 |
| 2003/0169306 A1 | * | 9/2003 | Makipaa et al. | 345/864 |
| 2004/0121823 A1 | * | 6/2004 | Noesgaard et al. | 455/575.1 |
| 2004/0204123 A1 | * | 10/2004 | Cowsky et al. | 455/565 |
| 2004/0248594 A1 | * | 12/2004 | Wren, III | 455/465 |

FOREIGN PATENT DOCUMENTS

| | | |
|---|---|---|
| CN | 1357174 A | 7/2002 |
| CN | 1399483 A | 2/2003 |
| EP | 1 041 841 A2 | 10/2000 |
| EP | 1 061 752 A1 | 12/2000 |
| EP | 1 283 651 A1 | 2/2003 |
| FI | 991322 | 10/2000 |

(Continued)

OTHER PUBLICATIONS

Newton, Harry,"Newton's Telecom Dictionary", Jan. 1998, Telecom Books and Fatiron Publishing, ed.13, p. 324.*

(Continued)

*Primary Examiner* — Meless Zewdu
(74) *Attorney, Agent, or Firm* — Harrington & Smith

(57) ABSTRACT

The invention relates to applying a handover algorithm in a mobile terminal. In the method, the state of a user interface component of the terminal is checked, and the handover algorithm is applied on the basis of the current state of the user interface component. The handover algorithm is applied only if the current state of the user interface component is active.

29 Claims, 2 Drawing Sheets

(56) References Cited

FOREIGN PATENT DOCUMENTS

| | | |
|---|---|---|
| GB | 2 289 191 A | 8/1995 |
| GB | 2 288 301 A | 11/1995 |
| JP | H11-331941 | 11/1999 |
| JP | 2000-278732 | 10/2000 |
| JP | 2002-223333 | 8/2002 |
| JP | 2002-261888 | 9/2002 |
| WO | WO 99/25146 | 5/1999 |
| WO | WO 99/45733 * | 9/1999 |
| WO | WO0150780 | 7/2001 |

OTHER PUBLICATIONS

English translation of CN 200480040573.1 Office action dated Mar. 20, 2009 (7 pages).

3GPP TS 23.009, "Handover Procedures", v5.6.0, Sep. 2003.

* cited by examiner

DETERMINING HANDOVER BASED ON STATE OF MOBILE TERMINAL

FIELD OF THE INVENTION

The present invention relates to arranging handover, more specifically to determining situations in which the handover algorithm is applied.

BACKGROUND OF THE INVENTION

To provide continuous service for a user, a mobile terminal has to carry out a handover process to change from one access channel to another. This change of channel may also cause the change of base station or another network element, such as a network element controlling a base station or core network element, for example a mobile switching centre or a support node of packet-switched services. It should be noted that handover may even occur to another kind of system (inter-system handover), for example between the GSM network and 3GPP (Third Generation Partnership Project) UMTS network (Universal Mobile Telecommunications System) and/or WLAN (Wireless Local Area Network).

Handover often occurs because the signal quality of the channel currently providing the transmission service is not good enough. Typically, a mobile terminal is arranged to measure the signals of the currently serving cell and the surrounding cells at specific time intervals. The quality of the currently used signal is compared with estimates of other available signals, and based on criteria set by a handover algorithm, a decision is made on whether to change the channel. Typically, at least signal strength is used by the handover algorithm. Other criteria are error rates, transmission power levels, traffic volume and naturally the total loss of the current connection. If the outcome of the handover algorithm is that the channel will be changed, signalling is initiated between the mobile terminal and the access network(s).

Today, many mobile terminals are capable of providing a wide variety of telecommunications services. For instance, a terminal may be capable of providing circuit-switched speech and data transfer services, packet-switched data transfer services and messaging services such as SMS (Short Message Service). These services may be provided via one type of network or different types of networks. For instance, the packet-switched data transfer service of the terminal may be provided by a connection to a wireless. local area network access point and the circuit-switched services may be provided by a connection to a public land mobile network (PLMN). In current networking applications, the application stays connected using the connection settings that were initially selected when the connection was established. Thus, handovers are only made within the currently serving system. Even if a new type of connection becomes available, the application will typically continue to use the original connection settings. WO 99/25146 discloses a dual-mode mobile phone wherein the user may, by pressing a specific button, initiate handover between a fixed network and a mobile network. When the dual-mode phone is leaving the fixed network coverage area, the phone sends a signal strength warning tone to the user. The user may then press the "handover" button, thereby causing the initiation of call transfer to the mobile network. However, it may be that the user is not actively using his terminal, for instance the device may be in the user's pocket, and the indication does not reach the user. In this kind of situations, the handover algorithm execution and the related measurements and comparisons prior to the indication may unnecessarily waste the terminal's resources as the user is not interested in changing from one network to another.

BRIEF DESCRIPTION OF THE INVENTION

An object of the invention is to provide an enhanced method for handover algorithm application. The object of the invention is achieved by a method, a mobile terminal, and a computer program product, which are characterized by what is disclosed in the independent claims. The preferred embodiments of the invention are set forth in the dependent claims.

The invention is based on the idea that a particular state of a (mechanical or non-mechanical) user interface component of a terminal is used as a pre-requisite for applying the handover algorithm. The state of the user interface component is checked, and the handover algorithm is applied on the basis of the current state of the user interface component. Thus, the handover algorithm is applied only if the current state of the user interface component is active.

The user interface component may be set to inactive or active state automatically and/or by user initiation. The state is not necessarily limited to one specific user interface component but may refer in general to the state of the user interface. The 'inactive' and 'active' states reflect the state of the user interface component in view of the usage activity, i.e. if the state is inactive, the component or the terminal is not actively used. The term 'handover algorithm' refers generally to any kind of process that selects an access channel amongst the available channels for the terminal and thus decides whether the terminal should change to another (signalling and/or traffic) channel. It is important to note that the handover algorithm is to be understood in a broad sense such that it may be applied in situations where there is no active application-level connection to be changed but instead the lower-layer logical relationship or connection is changed from channel (possibly also network) to another. The handover algorithm may also refer to an algorithm deciding on whether to change the access settings and channel for non-circuit-switched services reserving one or more traffic channels only during data transmission. A logical connection or session may thus exist for packet-switched data transmission even though no data is actively transmitted. For instance, a mobile terminal may comprise a handover algorithm which determines whether to provide handover for a GPRS session within the GPRS system and/or to another system, such as a WLAN system. Such a change of network is also sometimes referred to as roaming. Handover may thus be arranged for reserved connection resources or ability (although not in active use) to another channel. This kind of state may be achieved by authentication or GPRS PDP context reservation, for instance. Thus, the change of this kind of connectivity (provided e.g. by a certain IP address or phone number) to a new channel can also be considered handover although no active session exists.

The advantage of the invention is that the usage context of the terminal may be taken into account in handover decisions. The handover algorithm may be prevented from being applied on the basis of the status of a user interface component. The application of the handover algorithm, and thus also handovers may be limited for instance when the user is not actively using his/her terminal device. The method may be used for intra-system and/or inter-system handover algorithms. For instance, the terminal may be configured to apply the handover algorithm only to inter-system scenarios such that in the inactive state intra-system handovers are allowed but inter-system handovers are not. Surprising system changes can thus be avoided, for instance a change to a more expensive network. Further, the method may be applied such that the. terminal is arranged to stay in the current operator's network and handovers to channels of other operators are prevented when in inactive state.

It is possible to make the functionality completely automatic and transparent for the user, i.e. when the user is not actively using the terminal, the usage of the handover algorithm may be automatically prevented, and again as the user starts to use his/her terminal again., the handover algorithm may be automatically activated or allowed as applicable. Many terminals comprise a lid which is movable with respect to the body portion. In one embodiment, the state of the lid with respect to the body portion is checked. A further advantage of this embodiment is that the handover algorithm may be applied only when the lid is open, for instance. In one embodiment of the invention, the state of keypad locking is checked and can be used to determine whether handover algorithm may be applied.

In yet another embodiment of the invention, the checking of the state is arranged as a response to a need to initiate the handover algorithm. A further advantage of this embodiment is that the state of the user interface component is available when it is decided whether to initiate handover algorithm or not.

BRIEF DESCRIPTION OF THE DRAWINGS

In the following, the invention will be described in further detail by means of preferred embodiments and with reference to the accompanying drawings, in which.

DETAILED DESCRIPTION OF THE INVENTION

The invention can be used in any telecommunication apparatus, in which a handover algorithm may be applied for selecting one of the available channels for use in communication. Thus, the applicability of the invention is not limited to the network technologies shown in FIG. 1, but it may be applied in networks of other kind, such as the 3GPP UMTS system.

Figure 1:
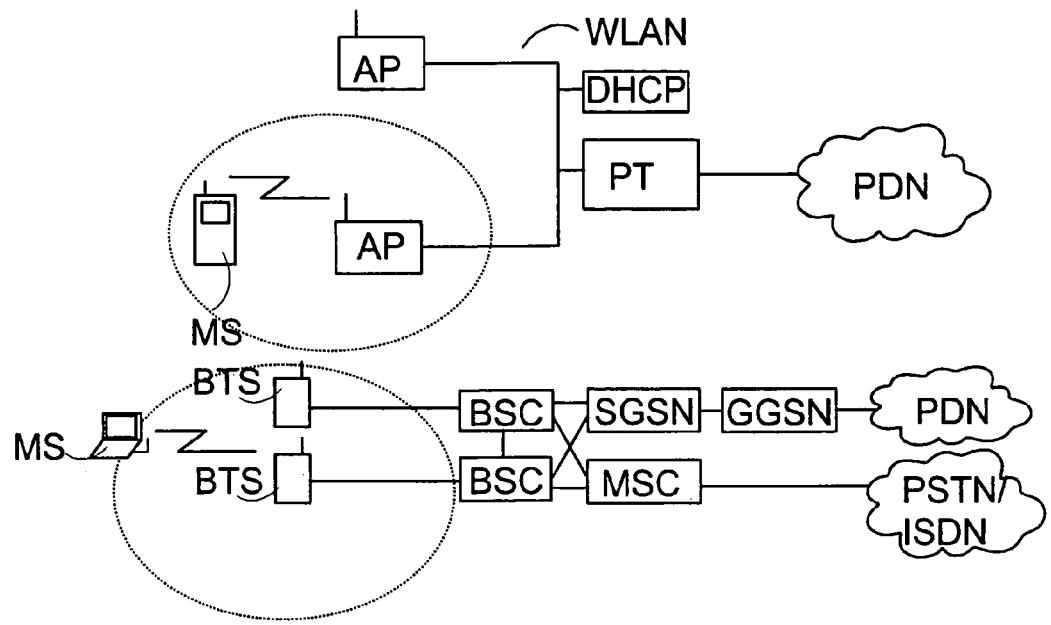
FIG. 1 is a block diagram showing a telecommunications system.

FIG. 1 shows one example of a telecommunications system comprising a wireless local area network WLAN and a PLMN network, namely a GSM/GPRS network. The wireless local area network WLAN comprises access devices called access points AP that offer radio access to a mobile station MS and thus terminate the broadband radio link. The access point AP manages the radio interface in accordance with the radio technology used; in accordance with the IEEE 802.11 standard in one preferred embodiment. A wireless network connection can also be set up directly between two mobile stations MS comprising a WLAN transceiver (Ad-hoc). The IEEE 802.11 specifications specify the protocols of both the physical layer and the MAC layer for data transfer over the radio interface. The AP also attends to the bridging or routing of radio interface data streams to and from other network nodes. The WLAN network may also provide a gateway interface to packet data networks PDN, such as the Internet, via a device called a portal PT or a bridge. Typically, the WLAN network also comprises other servers, such as a DHCP server (Dynamic Host Configuration Protocol) that allocates IP addresses to mobile stations MS. Typically in an area where there is WLAN coverage, there is also PLMN coverage.

In the PLMN of FIG. 1, a mobile services switching centre MSC provides the mobile station MS with circuit-switched services. A core network providing packet-switched services comprises a Serving GPRS Support Node (SGSN) serving mobile stations MS connected to a base station subsystem, and a Gateway GPRS Support Node (GGSN) providing a gateway function to external networks PDN, such as the Internet or a company's intranet. The system may also comprise other known network elements, not shown in FIG. 1, such as a short message service centre and elements of a billing system.

Both the SGSN and the MSC/VLR utilize the same Base Station System (BSS). The BSS comprises Base Transceiver Stations (BTS) communicating with the mobile stations MS over a radio path and Base Station Controllers (BSC) for controlling the radio frequencies and radio channels available to the base transceiver stations BTS connected to them. A base transceiver station BTS always comprises at least one transceiver that implements one carrier, i.e. eight timeslots, i.e. eight physical channels. One base transceiver station BTS typically serves one cell, but a solution is feasible wherein one base transceiver station BTS serves several sectored cells. The cells slightly overlap such that the connection can be maintained when the mobile station MS is moving from the coverage area of a BTS to another.

Figure 2:
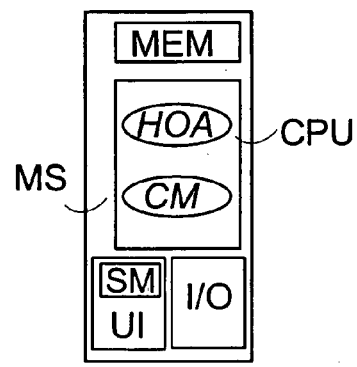
FIG. 2 is a block diagram illustrating a mobile station according to an embodiment of the invention.

As an example, the mobile station MS may be a conventional mobile terminal with speech and data transmission capabilities, a PDA device with telecommunication means, or a laptop computer provided by telecommunication means, e.g. by a removable data card. It should be noted that the mobile station MS may support communication with one or more access types, in the example of FIG. 1 the MS may communicate with WLAN and GSM/GPRS networks. As illustrated in FIG. 2, a mobile station MS comprises memory MEM, a user interface UI, I/O-means for arranging communication, and a Central Processing Unit CPU comprising one or more processors. According to an embodiment, the user interface UI is provided with sensing means SM for detecting the state of at least one mechanical user interface component. Computer program codes executed in the central processing unit CPU are used for causing the MS to implement the handover algorithm HOA, and control means CM are used at least for controlling the application of the handover algorithm HOA, some embodiments of which are illustrated later in association with FIGS. 3 and 4. The handover algorithm HOA may provide inter-system handovers (e.g. handover for GPRS PDP contexts to WLAN system and vice versa) and/or intra-system handovers (ordinary handovers within a cell, BTS, BSC, MSC/SGSN or between MSCs/SGSNs), or there may be more than one handover algorithm HOA in the mobile station MS. Hardware solutions or a combination of hardware and software solutions may also be used to implement the inventive functions.

Figure 3:
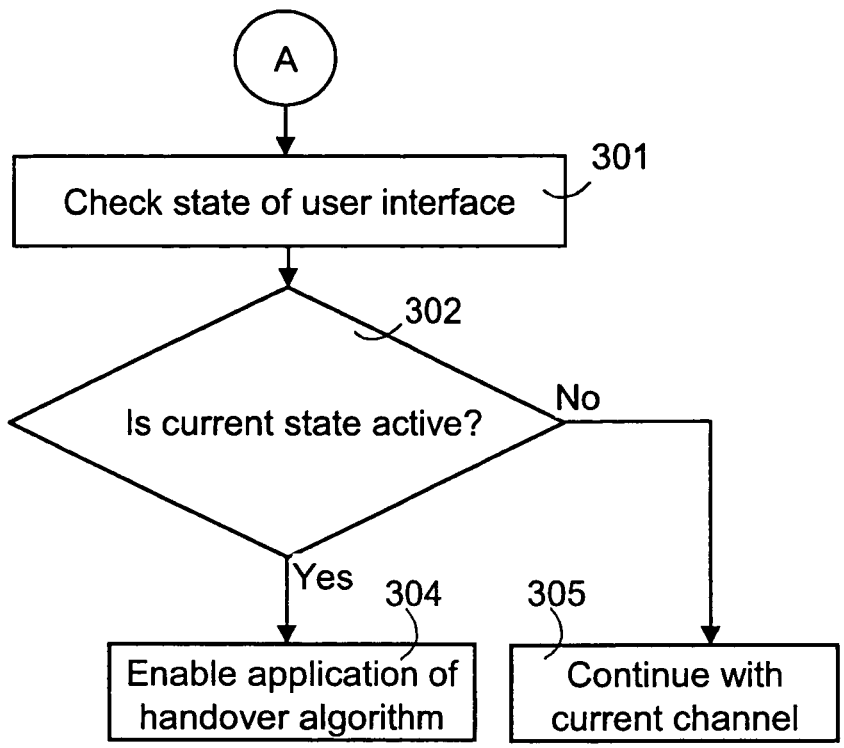
FIG. 3 is a flow chart illustrating a method according to an embodiment of the invention.

FIG. 3 illustrates a method according to an embodiment. This method may be implemented by the control means CM, for instance. In point A, there is a need to check the state of a user interface component to determine whether the application of a handover algorithm HOA is enabled.

In steps 301 and 302, the current state of at least one user interface UI component is checked. As will be illustrated later, there are many possible mechanical or non-mechanical user interface UI components, the state of which may be checked in step 301. The prerequisite is that the user interface component has at least two states; active and inactive. This step may involve checking state information from a certain memory location, requesting the state information from a controller of a user interface component, and/or utilizing the sensing means to detect the state of the mechanical user interface component, for instance.

If the state of the user interface component is inactive, the handover algorithm HOA is not applied 305. Thus, the mobile station MS continues communication with a network element or another terminal device by using the current channel(s).

If the state of the user interface UI component is active, the handover algorithm HOA may be applied 304. According to one embodiment, the handover algorithm HOA may be initiated. According to another embodiment, this applicability information (that the handover algorithm HOA may be applied) is stored by the control means CM, for example. Information on non-applicability may also be stored in step 305. The control means CM may thus be arranged to check the applicability information associated with the handover algorithm HOA when there is a need to initiate the handover algorithm HOA based on one or more handover algorithm triggering criteria. The control means CM may be arranged to initiate the handover algorithm HOA only if the current applicability information has been updated according to step 304.

The invention may be used with different handover algorithms. Typical procedures of a handover algorithm HOA may then be carried out, i.e. comparison of available channels and selection of one of the available channels to be used on the basis of the channel quality properties or some other criteria. It is to be noted that the handover algorithm HOA may consider intra-system channels and/or inter-system channels, depending on the mobile station's capabilities and the available systems. For instance, in the case of an inter-system handover algorithm, the decision to change the channel by the algorithm HOA may be due to a new available network capable of serving the user better; for instance providing faster or less costly transmission service. The handover algorithm HOA is typically proprietary and there is no need to change handover algorithms due to the present invention. If the output of the handover algorithm HOA is to change the channel, at least some of the access settings need to changed in the mobile station MS. This decision may cause at least one of the following: change of the access network or access device providing the connection for the terminal, change of the access method type, change of the properties of the current access method. The change of the connection may be arranged according to the underlying networks and transfer protocols. For instance, the 3GPP specification TS 23.009 "Handover Procedures", v. 5.6.0, September 2003, describes inter-access network and intra-access network handover procedures for the 3GPP system.

It is to be noted that according to a further embodiment, even the radio measurements prior to actual channel selection by the handover algorithm HOA can be avoided during inactive use by applying the above-illustrated features. Thus, radio measurements are only made in step 304 if the current state of the user interface is active. If the user interface component is inactive, the radio measurements and the application of the handover algorithm HOA may be omitted. This embodiment further saves the resources of the mobile station.

There are alternative embodiments for A in FIG. 3, which will be illustrated next with reference to FIGS. 4a, 4b, and 4c. It is also feasible that any combination of these embodiments is implemented in the mobile station MS.

Figure 4A:
FIGS. 4a, 4b, 4c illustrate alternative embodiments for the method of FIG. 3.

In the embodiment of FIG. 4a, there is a need to initiate the handover algorithm HOA. This may occur automatically for example based on channel measurements at certain time intervals, or as the current connection is lost. In this embodiment, the handover algorithm HOA is initiated in step 304.

Figure 4B:
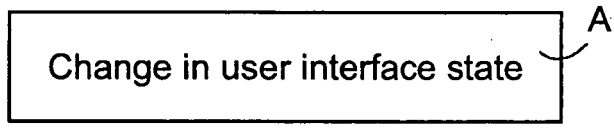

According to an alternative embodiment of FIG. 4b, step 301 is initiated as response to detecting a change in the state of the user interface component. The handover algorithm HOA may be set in step 304 as being applicable when the state is changed from inactive to active. This information may be stored for example in the handover control means CM, which may be arranged to initiate the handover algorithm HOA based on an other handover algorithm triggering criterion only if the current applicability information has been updated according to step 304 and thus indicates an active state. In an alternative embodiment, the handover algorithm HOA is automatically initiated in step 304 as a response to the change from the inactive state to the active state.

Figure 4C:
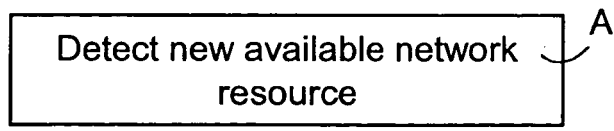

In another embodiment of FIG. 4c, step 301 is initiated and thus the state is checked in response to detecting a new available network resource. In one further embodiment, the discovery of a new network is only considered a trigger for roaming to the new network if the user interface is active (e.g. the lid of the mobile station is open). A handover algorithm deciding whether to change the network may be initiated in step 304. If the UI is not active, then the discovery of a new network may be ignored. For instance, this embodiment may be applied only to inter-system scenarios such that in an inactive state intra-system handovers are allowed but inter-system handovers are not.

Other triggers may also be used in point A in order to initiate step 301 and check the state of the user interface component. For instance, a time limit may be pre-determined in the mobile station which may then be arranged to monitor it: After the time limit has elapsed (e.g. from an earlier check or from a previous user activity), the step 301 may be initiated.

In one embodiment, the mobile station MS may store one or more further handover algorithm application rules. The rules may define further how and/or when the handover algorithm HOA may be applied for one or more states of the user interface component. Thus, the handover algorithm HOA is applied only if the rules enable the usage of the handover algorithm HOA for the current state of the user interface component. This embodiment facilitates the further specification of the application of the handover algorithm HOA, for example the user or some other authorized party may determine when and how the handover algorithm HOA is to be applied. This embodiment is particularly useful when there are more than the two states (inactive and active) for a user interface component.

In one alternative embodiment, at least part of the steps described above are implemented as part of the handover algorithm HOA. Thus, when the handover algorithm HOA is initiated for some reason (point A), the check according to steps 301 and 302 is performed. If the state of the user interface component is inactive, the HOA is stopped, i.e. the application of the HOA is prevented and the use of the current channel is continued. If the state is active, the HOA may be executed with typical tasks associated with a handover algorithm. Thus separate handover algorithm application control means (CM) are not necessary but the handover algorithm HOA may itself determine whether it can be applied or not.

At least part of the above-described logic may also be configurable such that the user may allow the application of the handover algorithm HOA even if the UI is not active.

In one embodiment, the user interface component is a mechanical component. In one further embodiment, the state depends on the position of the user interface component in respect of another component of the mobile station MS. Thus, the mobile station MS comprises a sensing arrangement SM for detecting the location of the user interface component. The state is determined based on information from the sensing arrangement SM. The sensing arrangement SM is directly or indirectly connected to the control means CM. The state may be determined as the position of the user interface component changes, i.e. when the state is changed, and then stored as state information. This state information may then be checked in step 301. This kind of state determination/checking functionality may also be applied to other embodiments.

Figure 5:
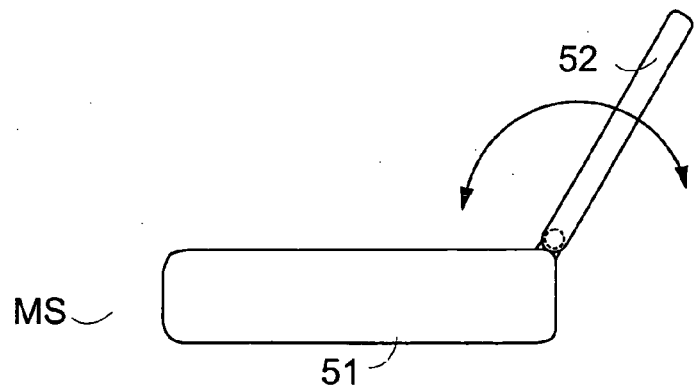
FIG. 5 is a block diagram illustrating the exterior of a mobile station according to an embodiment of the invention.

One example of a side view of a mobile station MS is given in FIG. 5. The mobile station MS comprises a body portion 51 and a lid 52 connected to the body portion 51. The lid 52 can be rotated with respect to the body portion 51, and according to an embodiment, the position of the lid 52 in relation to the body portion 51 is checked in step 301. There are at least two different states for this relationship. In one embodiment, there is a closed state for the lid 52, in which the mobile station MS is not actively used (the state is inactive), and an open state for the lid 52, whereby the MS may be actively used (active state). There are many feasible implementations; the lid 52 may be arranged such that in the closed state it completely covers one side of the body portion 51. One example of this kind of device is the Nokia Communicator™, in which the lid 52 comprising screen may be opened and closed by turning one side of the lid 52 in relation to the body portion 51 comprising keypad.

There is a sensing arrangement (SM in FIG. 1) in the lid 52 and/or a body portion 51 for sensing the state of the lid 52 or the body portion 51 in respect of the body portion 51 or the lid 52. The sensing arrangement may for example be implemented by magnetic detection, i.e. there is a magnet in the lid 52, the position of which the sensor in the body portion 51 detects. Another feasible solution is to utilize mechanical means. For instance, a portion of the lid 52 is arranged to push a switch in the body portion 51 when the lid 52 is closed, thereby causing the state to alter. It is feasible to utilize already existing sensing solutions.

In addition to FIG. 5, there are many other feasible implementations for arranging the user interface components and their relationships. For instance, in one embodiment, a lid may be slidably movable in relation to the body portion such that it at least partly overlaps the body portion in the closed position.

According to another embodiment, the mobile station MS comprises a keypad and a keypad locking functionality for locking the keypad. In one embodiment, the keypad is functionally locked and unlocked by a predetermined key combination or after a predetermined idle period. In this embodiment, the state of the keypad locking is checked in step 301. When the key combination input by the user is detected by the keypad control means (which may or may not be implemented by control means CM in FIG. 2), the keypad control means may also be arranged to detect the change in the state of the user interface and to indicate this to the control means CM controlling the application of the handover algorithm HOA. Alternatively, the state of the keypad locking is checked based on a specific request from the control means CM e.g. in step 301. It is also feasible to use some other key combination than the key combination for locking and/or unlocking the keypad to trigger the change in the user interface and thereby affect the application of the handover algorithm HOA. It is to be noted that at least part of the keypad of the mobile station MS in this or in other embodiments may be implemented as a touchscreen possibly operated by a pointer device. In one embodiment, the mobile station MS (preferably CM and SM) may be configured to check whether the pointer device is in its storage position. If it is, the state of the user interface for the above illustrated handover algorithm application determination purposes can be determined as inactive, otherwise as active.

According to another embodiment, the mobile station MS comprises a screen saver functionality. In step 301, the state of the screen saver functionality is checked. The state of the user interface component is inactive when the screen saver functionality is applied and the state of the user interface component is active when the screen saver functionality is not applied. This embodiment is one example of an automatically provided state change mechanism, i.e. as the screen saver can be set to begin after a predetermined idle period, the application of the handover algorithm may also be adjusted automatically without any user action.

It is also feasible to determine the state on the basis of the user interface state of one or more applications in the mobile station MS. Thus, the state of the user interface (for determining handover algorithm application) may be determined solely or at least partly based on a state of at least one application. For instance, if an email application is active in the (user interface UI of) mobile station MS, an inter-system handover algorithm is not applied or inter-system handover-decisions are not made, whereas if only a browser is active, the handover algorithm may be applied. Thus, inter-system handovers that typically cause the disconnection of an email session can be avoided.

According to yet another embodiment, the state of a user interface UI component may refer generally to the user interface and is not bound to any specific part of it. Thus, the user interface may in general be set as active or inactive by the user or automatically based on one or more predetermined triggers. For instance, the mobile station MS may comprise a timer which determines the state of the user interface as being inactive after a predetermined time period has elapsed after the latest user activity (e.g. button press), and changes the state from active to inactive after a certain idle time period. When the user again begins to use the mobile station, the mobile station MS, for instance the control means CM, is arranged to change the state from inactive to active. Thus, the functionality monitoring and changing the state of the user interface component may be a combination of the above-described features.

According to a further embodiment, there is a specific button or a menu item, the state of which is checked in step 301. Thus, there may be a specific button or menu item that can be used to set the user interface to an active or inactive state and affects the applicability to the handover algorithm. This button may determine the activity level of the user interface, and thus the state for the handover algorithm application determination purposes described above may be derived from the latest button or menu item activity. For instance, the mobile station MS may comprise a button or menu item for adjusting the screen light on/off.

The accompanying drawings and the description pertaining to them are only intended to illustrate the present invention. Different variations and modifications to the invention will be apparent to those skilled in the art, without departing from the scope of the invention defined in the appended claims. Different features may thus be omitted, modified or replaced by equivalents.

The invention claimed is:

1. A method comprising:
applying a handover algorithm in a mobile terminal, the handover algorithm being configured to select one of at least two available channels to be used for a connection from the mobile terminal, and a user interface of the terminal being adjustable to an inactive state or to an active state on the basis of a state of a user interface component, the user interface not being actively used by a user during the inactive state, the method further comprising:
checking the state of the user interface component to determine whether a new channel must be selected for the connection from the mobile terminal,
preventing, on the basis of the checking, application of the handover algorithm and maintaining communication using the current one or more channels in response to detecting that the current state of the user interface is inactive, and
enabling the application of the handover algorithm in response to detecting the state of the user interface to change from the inactive state to the active state.

2. The method according to claim 1, wherein the checking of the state occurs in response to detecting a new available network resource.

3. The method according to claim 1, wherein the terminal comprises a body portion and a lid which is connected to the body portion and can be moved with respect to the body portion, and wherein the state of the lid in relation to the body portion is checked.

4. The method according to claim 1, wherein the terminal comprises a keypad and a keypad locking functionality for locking the keypad, whereby the state of the keypad locking is checked.

5. The method according to claim 1, wherein the handover algorithm determines a change between channels of different network technologies.

6. The method according to claim 1, wherein radio measurements are omitted in response to the current state of the user interface component being inactive.

7. The method according to claim 1, wherein checking the state of the user interface component includes checking the state of a screen saver by checking state information from a memory location.

8. The method according to claim 1, wherein handover applicability information is stored at least when the state of the user interface component is changed from inactive state to active state.

9. The method according to claim 1, wherein the state of the user interface component is checked automatically in response to detecting a change in the state of the user interface component.

10. The method according to claim 1, wherein the terminal comprises a screen saver functionality, the state of which is detected, whereby the state of the user interface component is inactive when the screen saver functionality is applied and the state of the user interface component is active when the screen saver functionality is not applied.

11. The method according to claim 1, wherein the mobile terminal comprises a specific button to set the user interface to active or inactive state, the latest activity of the button affecting the state of the user interface component and the handover algorithm applicability.

12. An apparatus comprising at least one processor and memory, wherein computer program code is configured to, with the at least one processor cause the apparatus at least to:
check a state of a user interface component to determine whether a new channel must be selected for a connection from a mobile terminal via a handover algorithm, wherein a user interface of the mobile terminal is adjustable in an inactive state or in an active state on the basis of the state of the user interface component, the user interface not being actively used by a user during the inactive state,
when the current state of the user interface is inactive, the processor is configured to prevent, on the basis of the checking, application of the handover algorithm and maintain communication using one or more current channels, wherein the handover algorithm comprises selecting one of at least two available channels to be used for the connection from the mobile terminal, and
enable application of the handover algorithm in response to detecting the state of the user interface to change from the inactive state to the active state.

13. The apparatus according to claim 12, wherein the apparatus is configured to check the state in response to detecting a new available network resource.

14. The apparatus according to claim 12, wherein the terminal comprises a first portion and a second portion movable with respect to the first portion, and
the terminal is configured to check the position of the second portion with respect to the first portion.

15. The apparatus according to claim 14, wherein the terminal comprises a body portion and a lid which is connected to the body portion and can be moved with respect to the body portion, and
the terminal comprises a sensing arrangement for detecting the state of the lid.

16. The apparatus according to claim 12, wherein the terminal comprises a keypad and a keypad locking functionality for locking the keypad, and
the apparatus is configured to check the state of the keypad locking.

17. The apparatus according to claim 12, wherein the handover algorithm determines a change between channels of different network technologies.

18. The apparatus according to claim 12, wherein the apparatus comprises a timer configured to determine the state of the user interface component as inactive after a predetermined time period has elapsed after the latest user activity.

19. The apparatus according to claim 12, wherein the apparatus is configured to check the state of a mechanical user interface component.

20. The apparatus according to claim 12, wherein the apparatus is configured to omit radio measurements in response to the current state of the user interface component being inactive.

21. The apparatus according to claim 12, wherein the apparatus is the mobile terminal comprising the user interface.

22. The apparatus according to claim 12, wherein the apparatus is further configured to check the state of a screen saver by checking state information from a memory location.

23. The apparatus according to claim 12, wherein the apparatus is configured to store handover algorithm applicability information at least when the state of the user interface component is changed from inactive state to active state.

24. The apparatus according to claim 12, wherein the apparatus is configured to check the state of the user interface component automatically in response to detecting a change in the state of the user interface component.

25. The apparatus according to claim 12, wherein the terminal comprises a screen saver functionality, the state of which is detected, whereby the state of the user interface component is inactive when the screen saver functionality is applied and the state of the user interface component is active when the screen saver functionality is not applied.

26. The apparatus according to claim 12, wherein the mobile terminal comprises a specific button to set the user interface to active or inactive state, the latest activity of the button setting the state of the user interface component and affecting the handover algorithm applicability.

27. A non-transitory computer readable medium comprising program code for controlling a mobile terminal comprising a user interface and a handover algorithm by executing the program code in a processor of the terminal, wherein the program code comprises:

a program code portion for causing the terminal to check the state of a user interface component to determine whether a new channel must be selected for a connection from the terminal via a handover algorithm, wherein the user interface is adjustable in an inactive state or in an active state on the basis of the state of the user interface component, the user interface not being actively used by a user during the inactive state, a program code portion for causing the terminal, if the current state of the user interface is on the basis of the checking active, to enable application of the handover algorithm configured to select one of at least two available channels to be used for a connection from the mobile terminal, and if the current state of the user interface is inactive, to prevent the application of the handover algorithm and maintain communication using one or more current channels, and a program code portion for causing the terminal to enable the application of the handover algorithm in response to detecting the state of the user interface to change from the inactive state to the active state.

28. The non-transitory computer readable medium according to claim 21, wherein the program code causes the mobile terminal to omit radio measurements in response to the current state of the user interface component being inactive.

29. A method comprising:

applying a handover algorithm in a mobile terminal, wherein the handover algorithm is configured to select one of at least two available channels to be used for a connection from the mobile terminal;

checking state of screen saver functionality automatically in response to detecting a change in the state of the screen saver functionality to determine whether a new channel must be selected for the connection from the mobile terminal;

preventing, on the basis of the checking, application of the handover algorithm and maintaining communication using one or more current channels in response to detecting that the screen saver functionality is applied; and initiating the handover algorithm in response to detecting the state of the screen saver functionality to change from application of the screen saver functionality to the non-application of the screen saver functionality.

* * * * *